(12) United States Patent
Uchihara

(10) Patent No.: US 9,561,818 B2
(45) Date of Patent: Feb. 7, 2017

(54) SUSPENSION APPARATUS FOR STEERED WHEEL

(71) Applicant: TOYOTA JIDOSHA KABUSHIKI KAISHA, Toyota-shi, Aichi (JP)

(72) Inventor: Takeshi Uchihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/785,211

(22) PCT Filed: Feb. 13, 2014

(86) PCT No.: PCT/JP2014/053293
§ 371 (c)(1),
(2) Date: Oct. 16, 2015

(87) PCT Pub. No.: WO2014/181561
PCT Pub. Date: Nov. 13, 2014

(65) Prior Publication Data
US 2016/0083004 A1    Mar. 24, 2016

(30) Foreign Application Priority Data
May 8, 2013   (JP) .................................. 2013-098403

(51) Int. Cl.
*B62D 1/19*   (2006.01)
*B60G 3/20*   (2006.01)
*B62D 7/18*   (2006.01)

(52) U.S. Cl.
CPC . *B62D 1/19* (2013.01); *B60G 3/20* (2013.01); *B62D 7/18* (2013.01); *B60G 2200/144* (2013.01); *B60G 2200/156* (2013.01)

(58) Field of Classification Search
CPC ................ B60G 3/20; B60G 2200/144; B60G 2200/156; B62D 7/18
See application file for complete search history.

(56) References Cited

U.S. PATENT DOCUMENTS 4,819,959 A * 4/1989 Inoue ........................ B60G 3/26
                                                      280/124.143
4,863,188 A * 9/1989 Killian ..................... B60G 3/26
                                                      280/124.138
(Continued)

FOREIGN PATENT DOCUMENTS

JP    S64-44308 A    2/1989
JP    H04-183619 A   6/1992
(Continued)

OTHER PUBLICATIONS

Translation of 2007-055442 listed on IDS filed Oct. 16, 2015 attached.*

*Primary Examiner* — Faye M Fleming
(74) *Attorney, Agent, or Firm* — Oliff PLC

(57) ABSTRACT

A suspension apparatus for steered wheel includes a knuckle as a supporting member for rotatably supporting the steered wheel, two lower arms separately connected to joints as two lower-part connecting points equipped on lower part of the knuckle respectively, and two upper arms separately connected to joints as two upper-part connecting points equipped on an upper part of the knuckle respectively, and, connecting points of the two lower arms and the two upper arms to the knuckle are configured such that a rate of moving amount toward the vehicle inside to moving amount toward the vehicle front of a second extended line AP2 connecting the two joints straightly is more than the rate of a first extended line AP1 connecting the two joints straightly.

1 Claim, 4 Drawing Sheets

(56) References Cited

U.S. PATENT DOCUMENTS

| | | | |
|---|---|---|---|
| 4,941,677 A | | 7/1990 | Matsumoto et al. |
| 5,896,941 A | | 4/1999 | Kajiwara et al. |
| 6,752,409 B1 | * | 6/2004 | Kunert ................... B60G 3/20 280/124.135 |
| 7,967,310 B2 | * | 6/2011 | Frasch ................... B60G 3/20 280/124.134 |
| 8,444,160 B2 | * | 5/2013 | Okamoto ................ B60G 3/20 280/124.135 |
| 2005/0046136 A1 | * | 3/2005 | Sutton ................... B60G 3/20 280/124.135 |
| 2012/0043736 A1 | * | 2/2012 | Okamoto ................ B60G 3/20 280/124.135 |
| 2014/0319787 A1 | * | 10/2014 | Schindler ............... B62D 27/02 280/5.507 |
| 2015/0375589 A1 | * | 12/2015 | Goldberg ............... B60G 3/20 280/124.113 |
| 2015/0375590 A1 | * | 12/2015 | Mohrlock ............... B60G 3/20 280/5.5 |

FOREIGN PATENT DOCUMENTS

| | | |
|---|---|---|
| JP | H05-270224 A | 10/1993 |
| JP | H09-136520 A | 5/1997 |
| JP | 2007-055442 A | 3/2007 |

\* cited by examiner

SUSPENSION APPARATUS FOR STEERED WHEEL

TECHNICAL FIELD

The present invention relates to a suspension apparatus for a steered wheel provided on a steered wheel of a vehicle.

BACKGROUND ART

A suspension apparatus for a steered wheel provided on a steered wheel of a vehicle is described below in Patent Literature 1. The suspension apparatus has double jointed upper arms and lower arms, and have a structure which switches an outer wheel's scrub radius which controls turning characteristics under turning state from negative to positive for gaining understeer characteristics during braking.

CITATION LIST

Patent Literature

<Patent Literature 1> Japanese Patent Application Laid-Open (kokai) No. H05-270224

SUMMARY OF THE INVENTION

Incidentally, in this type of the suspension apparatus for a steered wheel with double jointed upper arms and lower arms, there is a requirement to decrease rack axial force which is a thrust force of power steering gears and so on to be needed during steering of a steered wheel. According to the requirement, in case of adopting the suspension apparatus described in Patent Literature 1, the rack axial force on a turning outer wheel which load is applied to during turning of the vehicle increases because a distance between the virtual king pin shaft and a tire ground contact point. In view of the above, according to the requirement, a first measure of changing an attaching point of the arm to the vehicle body, a second measure of shortening a rack stroke of the steered wheel, and a third measures of increasing output power at a power steering side and so on can be considered. However, in case of adopting the first measure, it becomes a major restriction to an arm layout and causes a problem that a flexibility of the design decreases. In addition, in case of adopting the second measure, a turning angle of the tire decreases and a problem that the minimum turning radius of the vehicle cannot be decreased occurs. In addition, in case of adopting the third measure, energy to be needed for assistance increases and a problem that the fuel efficiency decreases occurs. Thus, for decreasing the rack axial force in designing this type of the suspension apparatus for a steered wheel, a new measure which can solve the problems describes above is required.

Accordingly, the present invention is made in consideration of the above-mentioned problems, and one of the objects of the present invention is to provide useful technologies to reduce the rack axial force in a suspension apparatus for a steered wheel provided on a steered wheel of a vehicle without restrictions to an arm layout and a rack stroke.

In order to achieve the object described above, the suspension apparatus for a steered wheel according to the present invention is provided on a steered wheel of a vehicle and comprises a supporting member, two lower arms and two upper arms. The supporting member is for rotatably supporting the steered wheel. The two lower arms are independently connected to two lower-part connecting points equipped on a lower part of the supporting member respectively. The two upper arms are independently connected to two upper-part connecting points equipped on an upper part of the supporting member respectively.

The lower-part connecting points of the two lower arms and the upper-part connecting points of the two upper arms are arranged such that a first distance of a first extended straight line obtained by connecting the two lower-part connecting points, from a front-rear direction toward an inside of the vehicle, becomes longer than a second distance of a second extended straight line obtained by connecting the two upper-part connecting points, from the front-rear direction toward the inside of the vehicle, as moving toward a front direction of the vehicle.

In this case, it is possible to make "a movement locus of a virtual intersection point between each axis line of the two lower arms during steering of the steered wheel" and "a movement locus of a virtual intersection point between each axis line of the two upper arms during steering of the steered wheel" approach each other. Thus, it is possible to suppress an inclination of the virtual king pin shaft connecting the two virtual intersection points, thereby, it is possible to make a distance between "an intersection point between the virtual king pin shaft and a ground contact plain" and "the tire ground contact point" shorter. Herewith, a tire drag amount is suppressed and the rack axial force can be reduced. Especially, the rack axial force can be reduced by means of only changing backward and forward points of the supporting member (knuckle) side which rotatably supports the steered wheel without the restrictions to the arm layout and the rack stroke.

As for the suspension apparatus for a steered wheel described above, it is preferable that the first extended line inclines such that the first extended line separates more greatly from a vehicle baseline which extends in a vehicle front-rear direction at a vehicle-width center, as moving toward the front direction of the vehicle along the vehicle base line. In this case, it is possible to make "the movement locus of the virtual intersection point between each axis line of the two lower arms during steering of the steered wheel" and "the movement locus of the virtual intersection point between each axis line of the two upper arms during steering of the steered wheel" approach each other, and to make these two loci arranged relatively in almost parallel to each other. As a result, the tire drag amount during steering to the direction where the steered wheel becomes a turning inner wheel is more suppressed and the rack axial force can be more reduced.

Effects of the Invention

As described above, according to the present invention, as for the suspension apparatus for a steered wheel, the rack axial force can be reduced without the restrictions to the arm layout and the rack stroke.

DESCRIPTION OF EMBODIMENTS

The suspension apparatus for a steered wheel 10 as an example of the suspension apparatus for a steered wheel according to the present invention will next be described with reference to the drawings. This suspension apparatus for a steered wheel 10 is provided on a steered wheel of a vehicle.

Figure 1:
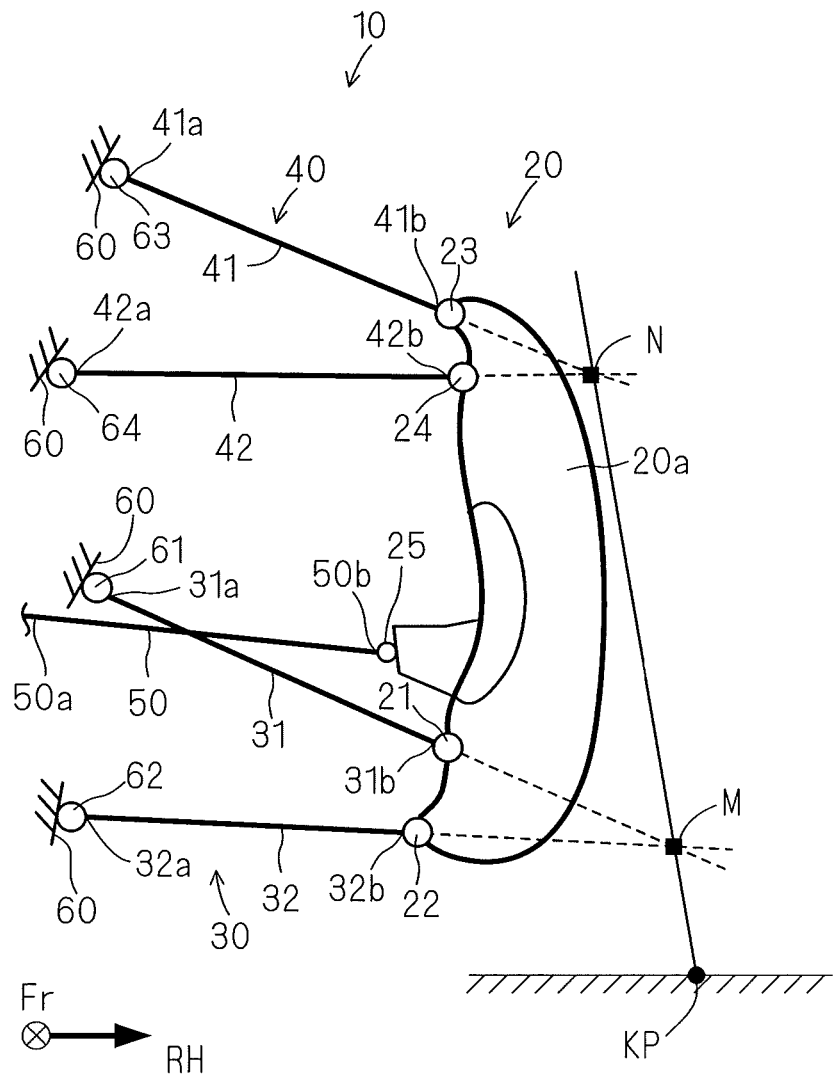
FIG. 1 is a diagram which schematically shows a status that the right front wheel component 20 of the suspension apparatus for a steered wheel 10 as the embodiment is seen from the oblique above at the vehicle rear.

A status that a right front wheel component 20 of the suspension apparatus for a steered wheel 10 is seen from the oblique above at the vehicle rear is shown schematically in FIG. 1. Arrows Fr show the vehicle forward direction and arrows RH show the vehicle right-hand direction in this FIG. 1 and the other drawings The right front wheel component 20 is equipped with the knuckle 20a as the supporting member which rotatably supports a right front wheel which is a steered wheel. This knuckle 20a is connected to a vehicle body 60 via each of a lower arm unit 30, an upper arm unit 40 and a tie rod 50. This knuckle 20a is corresponding to "the supporting member" of the present invention. Since a suspension structure for a left front wheel is similar to the suspension structure for the right front wheel, only the suspension structure for the right front wheel is explained hereinafter and the explanation of a suspension structure for the left front wheel is omitted.

The lower arm unit 30 is equipped with the front and rear pair (two) of lower arms 31, 32 which extend in the vehicle width direction (the crosswise direction of the vehicle) in a long-length respectively. As for the lower arm 31 at the vehicle forward side (hereinafter, referred to as a "front lower arm"), the one edge unit 31a in the vehicle inside is connected to the vehicle body 60 side via a bush 61, and the other edge unit 31b in the vehicle outside is connected to a lower region of the knuckle 20a via a joint 21 which is the lower-part connecting point. Similarly, as for the lower arm 32 at the vehicle backward side (hereinafter, referred to as a "rear lower arm"), the one edge unit 32a in the vehicle inside is connected to the vehicle body 60 side via a bush 62, and the other edge unit 32b in the vehicle outside is connected to the lower region of the knuckle 20a via a joint 22 which is the lower-part connecting point. Each axis line of the front lower arm 31 and the rear lower arm 32 intersects each other at the virtual intersection point M. These front lower arm 31 and rear lower arm 32 are corresponding to "the two lower arms" of the present invention.

The upper arm unit 40 is equipped with the front and rear pair (two) of upper arms 41, 42 which extends in the vehicle width direction (the crosswise direction of the vehicle) in a long-length respectively. As for the upper arm 41 at the vehicle forward side (hereinafter, referred to as a "front upper arm"), the one edge unit 41a in the vehicle inside is connected to the vehicle body 60 side via a bush 63, and the other edge unit 41b in the vehicle outside is connected to the upper region of the knuckle 20a via a joint 23 which is the upper-part connecting point. Similarly, as for the upper arm 42 at the vehicle backward side(hereinafter, referred to as a "rear upper arm"), the one edge unit 42a in the vehicle inside is connected to the vehicle body 60 side via a bush 64, and the other edge unit 42b in the vehicle outside is connected to the upper region of the knuckle 20a via a joint 24 which is the upper-part connecting point. Each axis line of the front upper arm 41 and the rear upper arm 42 intersects each other at the virtual intersection point N. The virtual king pin shaft is formed by the line connecting the virtual intersection point N and the virtual intersection point M described above straightly. These front upper arm 41 and rear upper arm 42 are corresponding to "the two upper arms" of the present invention.

The tie rod 50 is a long shape member, the one edge unit 50a inside the vehicle is connected to a rack axis (unillustrated), and the other edge unit 50b outside the vehicle is connected to the knuckle 20a via a joint 25. This rack axis moves in the vehicle width direction corresponding to revolution of a pinion shaft (unillustrated) which occurs when a driver operates a steering wheel. In this case, the rack axial force working on the rack axis is thrust force combined with assist force of power steering gears required during turning of the right front wheel which is a steered wheel and operating force of the steering wheel by the driver, and works on the right front wheel vie the tie rod 50 and the knuckle 20a. This rack axial force can be defined as steering force required during turning of the right front wheel.

Meanwhile, it is assumed that the intersection point between the virtual king pin shaft and the ground contact plain is KP, and the tire ground contact point of the right front wheel is J, because the tire ground contact point J rotates around the intersection point KP during steering, as the distance D (is also called "the scrub radius") between the intersection point KP and the tire ground contact point J becomes longer, the tire drag amount becomes larger when the right front wheel is steered where the wheel turning angle becomes the same. That is, this tire drag amount nearly equal to (coincides with) the integral of the product of the distance D and the wheel turning angle. In addition, it is known that the rack axial force is increased due to the increase in this tire drag amount. Accordingly, the right front wheel component 20 as the embodiment is characterized by a rack axial force reduction structure which reduces the rack axial force by controlling moving directions of the virtual king pin shaft in relation with increasing and decreasing of the tire drag amount, and a specific example of this rack axial force reduction structure will be described with reference to the FIG. 2-FIG. 5.

Figure 2:
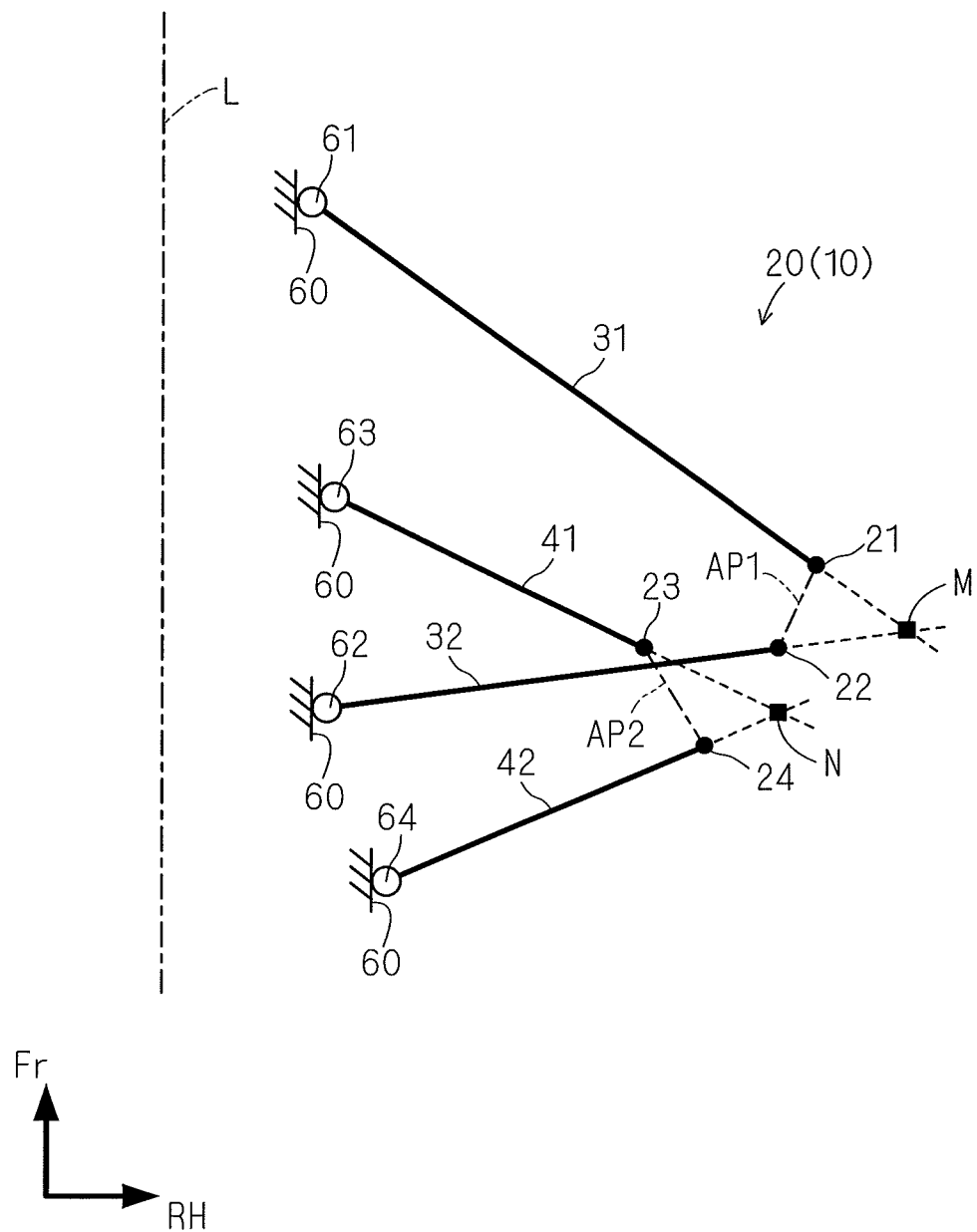
FIG. 2 is a diagram which schematically shows a planar view of the rack axial force reduction structure of the right front wheel component 20 in FIG. 1.
Figure 3:
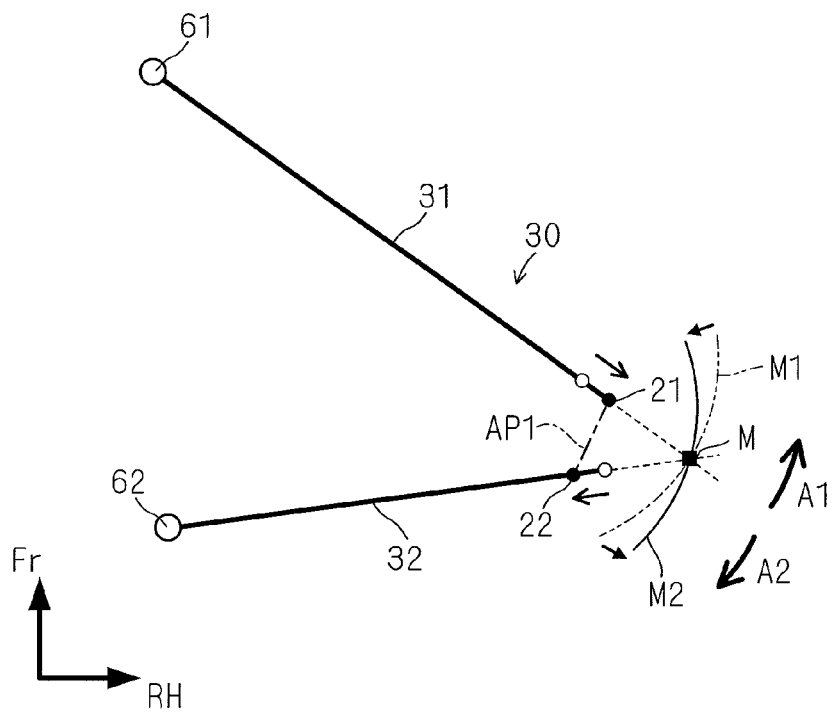
FIG. 3 is a diagram which shows the movement loci M1, M2 of the virtual intersection point M between the front and rear pair of lower arms 31, 32 in FIG. 2.
Figure 4:
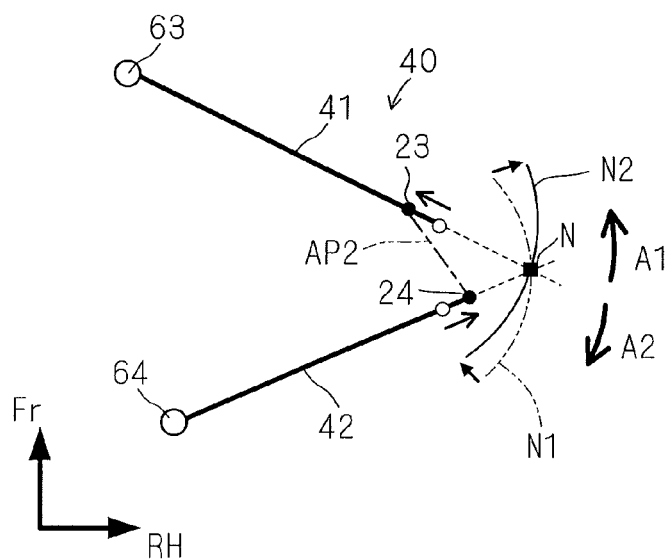
FIG. 4 is a diagram which shows the movement loci M1, M2 of the virtual intersection point N between the front and rear pair of upper arms 41, 42 in FIG. 2.

As shown in FIG. 2, the virtual king pin shaft is the straight line connecting the virtual intersection point M in the lower arm unit 30 and the virtual intersection point N in the upper arm unit 40. Thus, it is possible to control the moving directions of the virtual king pin shaft by controlling moving directions of these virtual intersection points M, N. For this purpose, the rack axial force reduction structure as the embodiment is characterized by a relative arrangement between "a first extended line AP1 straightly connecting two joints 21, 22 which are backward and forward points of the knuckle 20a side of the lower arm unit 30" and "a second extended line AP2 straightly connecting two joints 23, 24 which are backward and forward points of the knuckle 20a side of the upper arm unit 40."

As a first feature of the rack axial force reduction structure, connecting points of the two lower arms 31, 32 and the two upper arms 41, 42 are configured such that "a rate of moving amount toward the vehicle inside to moving amount toward the vehicle front of the second extended line AP2" is more than "the rate of the first extended line AP1." That is, in FIG. 2, the first extended line AP1 and the second extended line AP2 extend in open-front shape such that these lines separate from each other toward the vehicle front, and "an inclination angle of the second extended line AP2 to the vehicle baseline L which extends in the vehicle front-rear direction at the vehicle center is more than "the inclination angle of the first extended line AP1 to the vehicle baseline L." In this case, the second extended line AP2 may be arranged in vehicle inside more than the first extended line AP1 as shown in FIG. 2, or it may be arranged in vehicle outside more than the first extended line AP1. In addition, as a second additional feature of the rack axial force reduction structure, the first extended line AP1 inclines such that it separates from the vehicle baseline L toward the vehicle front regarding the vehicle base line L. In this case, the first extended line AP1 is also the line connecting the other edge unit 31b of the front lower arm 31 and the other edge unit 32b of the rear lower arm 32 straightly (the line connection backward and forward points in the knuckle 20a side). In addition, the second extended line AP2 is also the line connecting the other edge unit 41b of the front upper arm 41 and the other edge unit 42b of the rear upper arm 42 straightly (the line connection backward and forward points in the knuckle 20a side).

In order to realize the arrangement of the first extended line AP1 described above, as referring FIG. 3, it is necessary that the position of the joint 21 moves to the side of the virtual intersection point M on the axis of the front lower arm 31 as shown by the arrow in the figure and the position of the joint 22 moves to the opposite side of the virtual intersection point M on the axis of the rear lower arm 32 as shown by the arrow in the figure. In this case, the movement locus of the virtual intersection point M moves leftward from M1 to M2 with inclination by changing position of the joint 21, 22 when the right front wheel is steered to the first direction A1 which is the right direction and to the second direction A2 which is the left direction. The first direction A1 is the direction where the right front wheel becomes the turning inner wheel, and the second direction A2 is the direction where the right front wheel becomes the turning outer wheel.

In order to realize the arrangement of the second extended line AP2 described above, as referring FIG. 4, it is necessary that the position of the joint 23 moves to the opposite side of the virtual intersection point N on the axis of the front upper arm 41 as shown by the arrow in the figure and the position of the joint 24 moves to the side of the virtual intersection point N on the axis of the rear upper arm 42 as shown by the arrow in the figure. In this case, the movement locus of the virtual intersection point N moves rightward from N1 to N2 with inclination by changing position of the joint 23, 24 when the right front wheel is steered to the first direction A1 which is the right direction and to the second direction A2 which is the left direction.

By making the movement locus of the virtual intersection point M rotate in a counterclockwise direction due to changing position of the joint 21, 22, and making the movement locus of the virtual intersection point N rotate in a clockwise direction due to changing position of the joint 23, 24, it is possible to make the movement locus M2 and the movement locus N2 approach each other, especially, it is possible that to make the movement locus M2 and the movement locus N2 arranged relatively in almost parallel to each other. In this case, as referring FIG. 5, as for the intersection point KP between "the virtual king pin shaft which connects the virtual intersection point M and the virtual intersection point N straightly" and "the ground contact plain", the movement locus of the intersection point KP moves from KP1 shown by the two-dot chain line to KP2 shown by the solid line when the right front wheel is steered to the first direction A1 and to the second direction A2. The movement locus KP1 is corresponding to the situation that the movement locus of the virtual intersection point M is M1 and the movement locus of the virtual intersection point N is N1, and the movement locus KP2 is corresponding to the situation that the movement locus of the virtual intersection point M is M2 and the movement locus of the virtual intersection point N is N2. In this case, the movement locus of the intersection point KP moves leftward from KP1 to KP2 with inclination.

Figure 5:
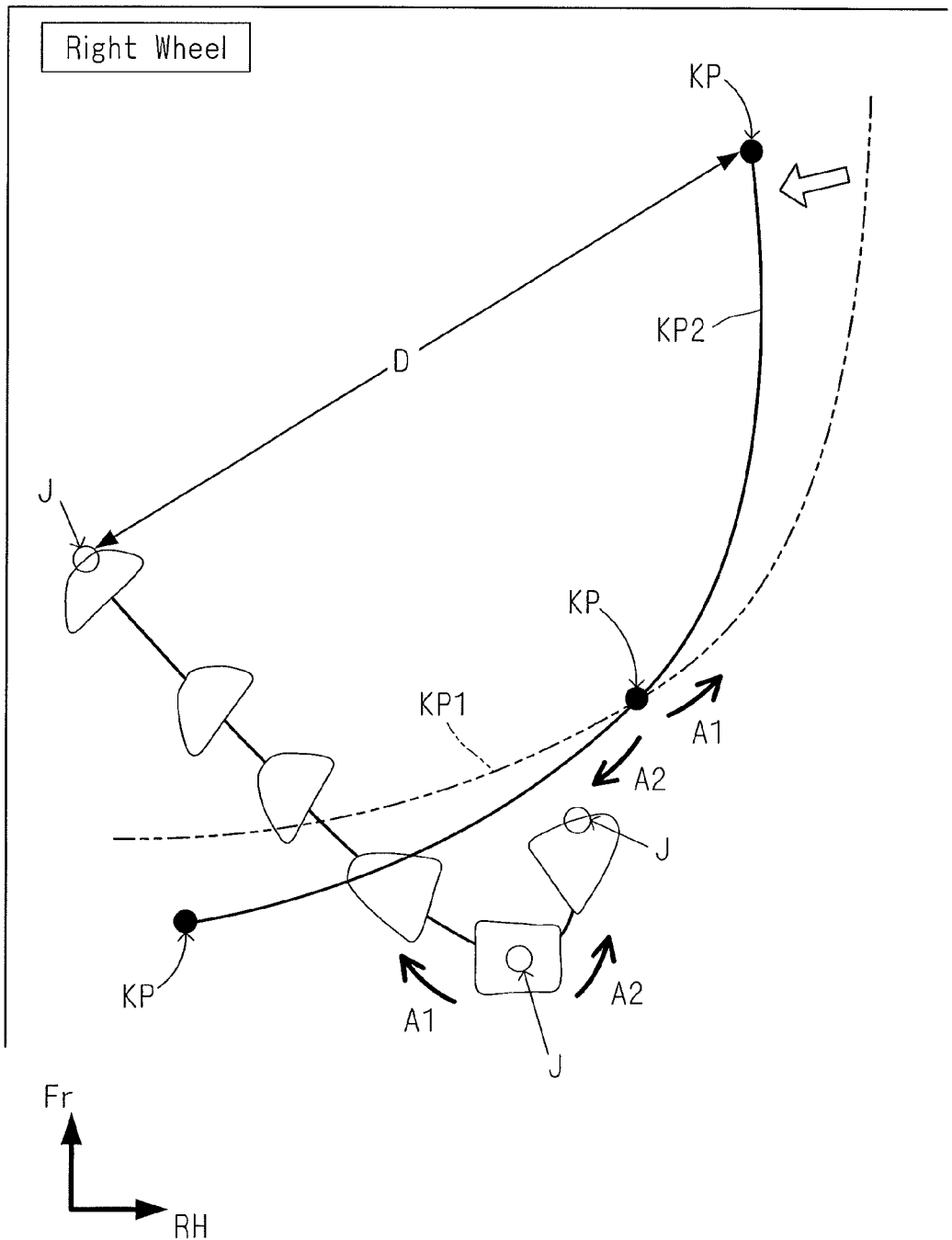
FIG. 5 is a diagram which shows the movement locus of the intersection point KP between the virtual king pin shaft and the ground contact plain, and the distance D between the intersection point KP and the tire ground contact point J.

Here, as referring FIG. 5, because the intersection point KP between the virtual king pin shaft of the right front wheel and the ground contact plain moves significantly during steering to the first direction A1 which is the right direction, the distance D between the intersection point KP and the tire ground contact point J becomes larger during steering to the first direction A1. Accordingly, in this embodiment, the movement loci of the virtual intersection point M, N are configured such that the intersection point KP moves toward the vehicle inside more during steering to the first direction A1 which is the right direction, that is, so as to prevent the virtual king pin shaft from inclining toward the vehicle outside. As a result, it is possible to reduce the rack axial force by means of suppressing the distance D between the intersection point KP and the tire ground contact point J. In addition, positions of the virtual intersection point M and the bush 61, 62 don't change by changing position of the joint 21, 22, and positions of the virtual intersection point N and the bush 63, 64 don't change by changing position of the joint 23, 24. Thus, the rack axial force can be reduced by means of only changing backward and forward points of the knuckle 20a side without the restrictions to the arm layout of the two lower arms 31, 32 and the two upper arms 41, 42 and the rack stroke.

The present invention is not limited to the typical embodiment described above, and various applications and modifications can be considered. For example, each application described below based on the embodiment described above can be implemented.

The rack axial force reduction structure as the embodiment described above has both the first feature where "a rate of moving amount toward the vehicle inside to moving amount toward the vehicle front of the second extended line AP2" is more than "the rate of the first extended line AP1" and the second feature where the first extended line AP1 inclines such that the first extended line AP1 separates from the vehicle baseline L which extends in the vehicle front-rear direction at the vehicle center toward the vehicle front regarding the vehicle base line L, but it is enough that the rack axial force reduction structure has at least the first feature. Thus, for example, the first extended line AP1 in FIG. 2 may be modified from the right-up straight line to a left-up straight line. In case that the rack axial force reduction structure has both the first feature and the second feature, it is possible to make the movement locus M of the two lower arms 31, 32 and the movement locus N of the two upper arms 41, 42 arranged relatively in more parallel to each other compared to the case having only the first feature, then, it is possible to enhance the reduction effect of the rack axial force.

The invention claimed is:

1. A suspension apparatus for a steered wheel, said apparatus provided to a steered wheel of a vehicle comprising:

a supporting member for rotatably supporting said steered wheel;

two lower arms independently connected to two lower-part connecting points equipped on a lower part of said supporting member respectively; and two upper arms independently connected to two upper-part connecting points equipped on an upper part of said supporting member respectively;

wherein, said lower-part connecting points of said two lower arms and said upper-part connecting points of said two upper arms are arranged such that a first distance of a first extended straight line obtained by connecting said two lower-part connecting points, from a front-rear direction toward an inside of said vehicle, becomes longer than a second distance of a second extended straight line obtained by connecting said two upper-part connecting points, from said front-rear direction toward said inside of said vehicle, as moving toward a front direction of said vehicle; and said first extended line inclines such that said first extended line separates more greatly from a vehicle baseline which extends in a vehicle front-rear direction at a vehicle-width center, as moving toward said front direction of said vehicle along said vehicle base line.

* * * * *